United States Patent [19]  
Cheng

[11] Patent Number: 4,554,149  
[45] Date of Patent: Nov. 19, 1985

[54] METHOD FOR PRODUCING CARBON BLACK

[75] Inventor: Paul J. Cheng, Bartlesville, Okla.

[73] Assignee: Phillips Petroleum Company, Bartlesville, Okla.

[21] Appl. No.: 518,704

[22] Filed: Jul. 29, 1983

[51] Int. Cl.[4] .................... C01B 31/02; C09C 1/48
[52] U.S. Cl. .................... 423/450; 423/449; 423/456; 422/150
[58] Field of Search ............... 423/449, 450, 453, 454, 423/455, 456, 457; 422/150

[56] References Cited

U.S. PATENT DOCUMENTS

| | | | |
|---|---|---|---|
| 2,781,246 | 2/1957 | Goldtrap | 23/209.4 |
| 3,075,829 | 1/1963 | Latham, Jr. et al. | 23/209.4 |
| 3,310,379 | 3/1967 | Hinson et al. | 23/209.4 |
| 3,490,869 | 1/1970 | Heller | 23/209.4 |
| 4,071,496 | 1/1978 | Kraus et al. | 260/42.36 |
| 4,206,192 | 6/1980 | Austin | 423/455 |
| 4,261,961 | 4/1981 | Scott et al. | 423/449 |
| 4,296,087 | 10/1981 | Lewis | 423/450 |
| 4,341,750 | 7/1982 | Vanderveen | 423/449 |
| 4,355,016 | 10/1982 | Stacy et al. | 423/450 |
| 4,393,034 | 7/1983 | Smith | 423/450 |
| 4,460,558 | 7/1984 | Johnson | 423/450 |
| 4,490,346 | 12/1984 | Cheng | 423/450 |
| 4,503,027 | 3/1985 | Cheng | 423/450 |

FOREIGN PATENT DOCUMENTS 991483 5/1965 United Kingdom ............... 423/450

Primary Examiner—Gregory A. Heller  
Attorney, Agent, or Firm—French and Doescher

[57] ABSTRACT

The tint residual of carbon black being produced in an oil furnace charging oxygen-enriched air falls as oxygen enrichment increases. An apparatus for conducting the process utilizing a low BTU fuel with external tangential combustors is also disclosed.

4 Claims, 3 Drawing Figures

METHOD FOR PRODUCING CARBON BLACK

The present invention relates to method and apparatus for producing carbon black. In another aspect the invention relates to a method for regulating the tint residual of a carbon black being produced in a production process. In another aspect the invention relates to combusting low-energy content fuel to provide combustion gases suitable for pyrolyzing a carbonaceous feedstock to form carbon black.

In a carbon black plant, off-gas from the reactor filter system almost always contains combustible materials in minor quantities. It would be highly desirable and economical to exploit the BTU value of the off-gas to provide the heat for the pyrolysis of the carbon black feedstock. Problems encountered in producing carbon black by the combustion of combustible portions of the off-gas recovered from the filters include control of temperature, oxygen content, and flow rate of the combustion gases.

Carbon blacks impart improved properties to rubber goods, especially greater strength and longer life. It has been found that carbon blacks produced in vortex flow, oil furnace reactors which have a wide distribution in aggregate particle sizes impart improved resilience, lower hysteresis and better wire cord adhesion to rubber into which it has been compounded than conventional blacks, which have a narrower distribution in aggregate particle sizes.

Tint residual, which is a calculated property of carbon black made by a vortex flow, oil furnace process, is reflective of the distribution of the aggregate sizes in a carbon black sample, as compared to the average distribution and aggregate sizes of blacks commercially available from Phillips Petroleum Company and others manufacturing carbon black by vortex flow, oil furnace type processes. Tint residual is the difference between the tint observed during testing of carbon black sample and the tint which would be expected from the sample because of its surface area and structure. Tint residual is given by the equation:

$$TR = T - [56.0 + 1.057(CTAB) - 0.002745(CTAB)^2 - 0.2596(C-DBP) - 0.201(N_2SA - CTAB)]$$

In this formula the abbreviations used have the following meanings and the properties are measured as described:

TR: Tint residual

CTAB: The specific surface area of the carbon black sample measured as described in ASTM D 3765-79, meter$^2$/gm.

N$_2$SA: The surface area of the carbon black sample measured using nitrogen in accordance with the ASTM method D-3037-76, meter$^2$/gm.

C-DBP: The structure of the compressed carbon black sample measured as described in ASTM D 3493-76, cc/100 grams.

T: The tint or tinting strength of the carbon black sample measured in accordance with ASTM 3265-76, assigning reference black IRB No. 4 the value of 100.

A carbon black sample which is characterized by a negative tint residual has a relatively broad distribution in aggregate sizes while a carbon black sample characterized by a positive tint residual has a relatively narrow distribution of particle sizes. Normally, the tint residual exhibited by a carbon black sample will be between about −20 and +20, commercially available blacks having a tint residual between about −2 and +15, usually between about −2 and +5.

The tint exhibited by a carbon black sample is dependent upon, among other things, the size of the particles in the sample as well as on the size distribution of the particles making up the sample. Tint calculated fom the CTAB, N$_2$SA, and C-DBP values obtained from a sample, as in the bracketed portion of the above equation, fails to fully account for the size distribution of the particles. The tint residual of the sample, the difference between the observed tint and calculated tint, is caused largely by the particle size distribution in the sample and thus can be employed to yield useful information.

For a carbon black characterized by a given surface area and structure, it would be highly desirable to minimize the tint exhibited by the sample, because the low tint would be indicative of a wide distribution of particle size. Conversely, for a carbon black sample exhibiting a given tint, it would be highly desirable to increase the average surface area of the particles.

OBJECTS OF THE INVENTION

An object of this invention is to provide an apparatus for combusting low BTU content gases to produce a carbon black having a tint residual of −5 or less.

Another object of the invention is to provide an apparatus for producing carbon black having a tint residual of −5 or less which uses off-gas separated from carbon black as fuel for forming the hot combustion gases.

Another object of the invention is to provide a method for producing carbon black having a tint residual of −5 or less in which low BTU fuel is utilized to form the combustion gases.

It is a further object of this invention to provide a method for controlling the tint residual of carbon black product being produced in a process for producing carbon black.

STATEMENT OF THE INVENTION

According to certain aspects of the present invention, there is provided a process for producing carbon black comprising combusting a low BTU fuel containing at least 5% combined volume of molecular hydrogen and carbon monoxide with oxygen-enriched air to form combustion gases; admixing the thus formed combustion gases with a carbonaceous feedstock, and pyrolyzing the carbonaceous feedstock to form carbon black. It has been found that utilizing oxygen-enriched air provides a decrease in tint residual with surface area being held constant.

According to another aspect of the present invention, there is provided a method for changing the tint residual of a carbon black product having a selected surface area being produced by a reactor charging oxygen, air and fuel for combustion to form the combustion gases and carbonaceous feedstock for pyrolysis by the combustion gases to form carbon black comprising changing in a first direction (+/−) the oxygen rate, fuel rate and carbonaceous feedstock rate and changing in a second direction (−/+) the air rate to bring the reactor back on line for the carbon black having the selected surface area; whereby the tint residual of the carbon black having the selected surface area will be changed in the second direction (−/+).

According to a still further aspect of the present invention, there is provided an apparatus for producing carbon black comprising a mass of refractory defining a first generally cylindrical precombustion zone having an upstream end and a downstream end and a generally cylindrical sidewall connecting the upstream end with the downstream end, as first end wall defining an upstream end of the first precombustion zone, a first generally cylindrical reaction zone having a diameter less than that of the first precombustion zone in axial alignment with and connected to the downstream end of the first precombustion zone, a tunnel opening through the generally cylindrical sidewall of the first precombustion zone in a generally tangential direction, a generally cylindrical combustion zone in axial alignment with and connected to the tunnel, said generally cylindrical combustion zone having an upstream end and a downstream end; and a second end wall defining the upstream end of the combustion zone; a gas compressor positioned to draw from the atmosphere; a first conduit means establishing a flow path between the gas compressor and the combustion zone; a source of oxygen; a second conduit means which can comprise a part of the first conduit means connecting the source of oxygen to the combustion zone; a source of low-BTU fuel gas containing at least 5% by combined volume of carbon monoxide and hydrogen; and a third conduit means connecting the source of low BTU fuel gas with the combustion zone.

DETAILED DESCRIPTION OF THE INVENTION

Figure 1:
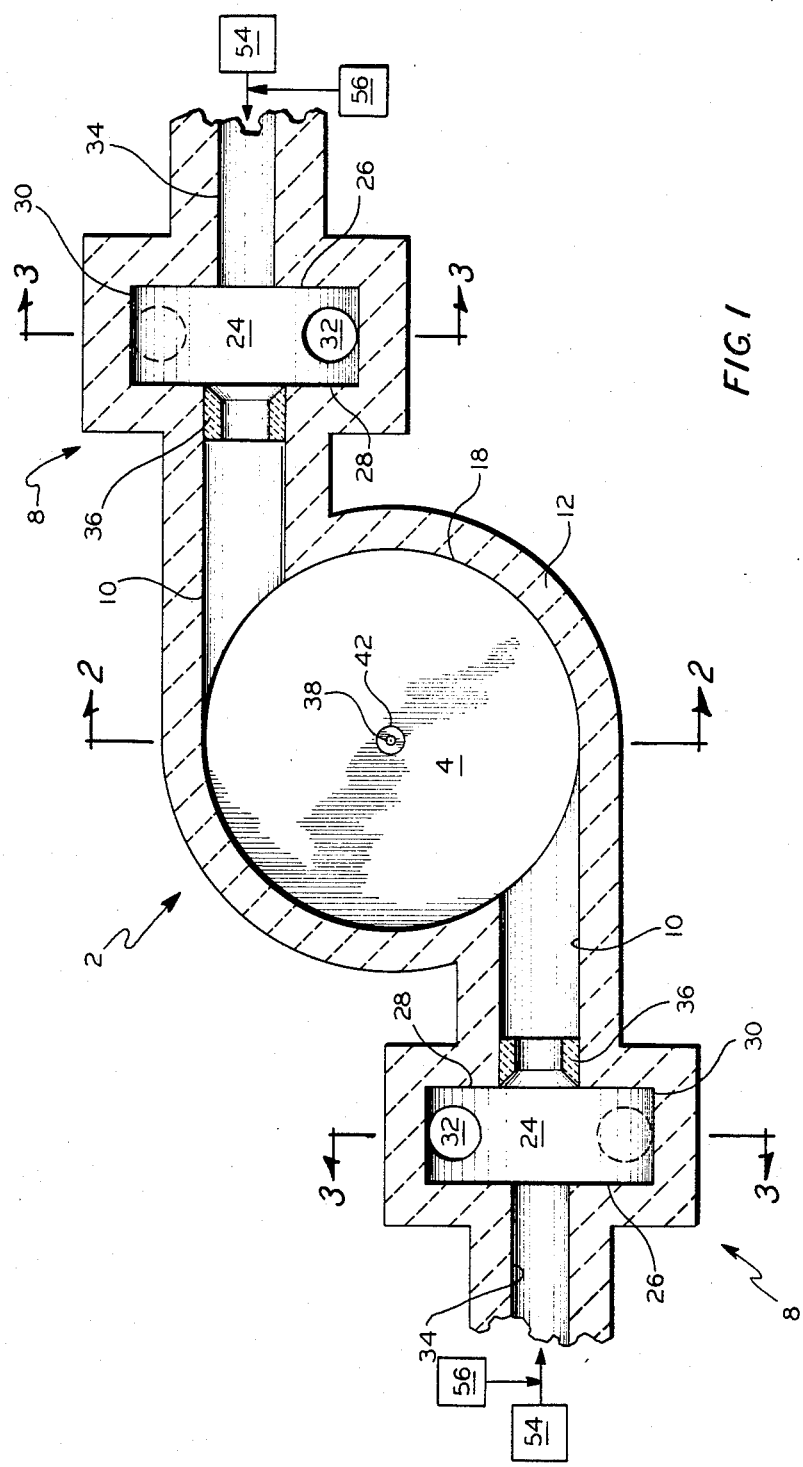
FIG. 1 schematically illustrates in side-sectional view a carbon black reactor embodying certan features of the present invention.
Figure 2:
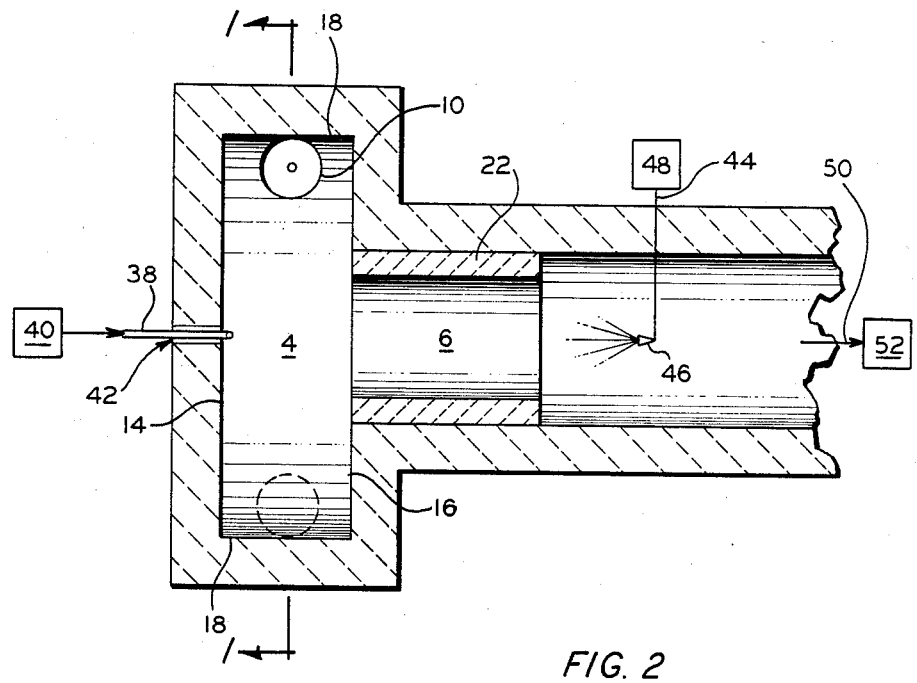
FIG. 2 represents a cross-sectional view of the apparatus of FIG. 1 taken along lines 2—2.
Figure 3:
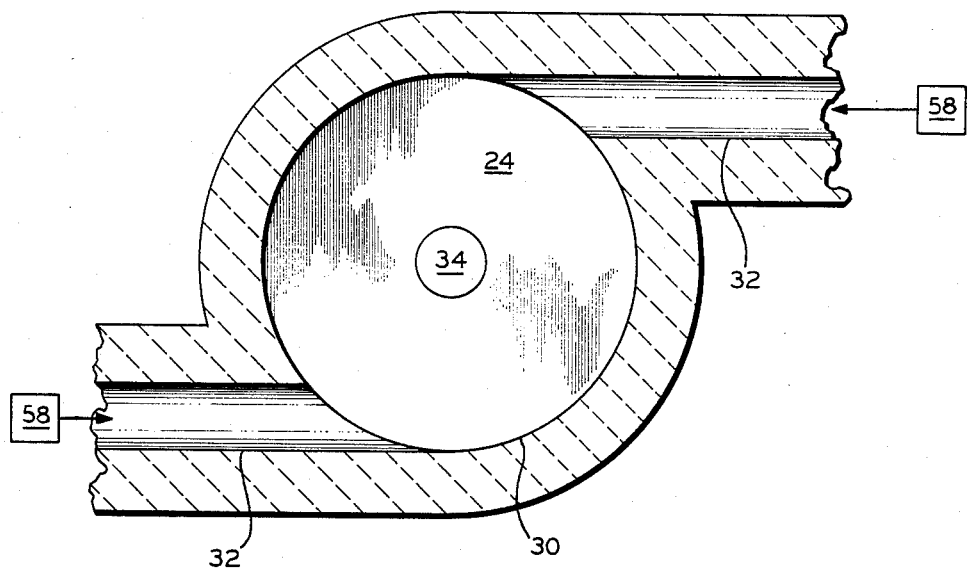
FIG. 3 illustrates in side-sectional view certain features of the apparatus of FIG. 1 taken along lines 3—3.

With reference to FIGS. 1 and 2, an apparatus 2 comprises a precombustion zone 4 and a reaction zone 6. At least one external combustion zone 8 is connected to the precombustion zone 4 by a tunnel 10.

A preferred apparatus 2 according to the present invention comprises a mass of refractory 12 defining the first generally cylindrical precombustion zone 4. The zone 4 has an upstream end defined by upstream end wall 14, a downstream end defined by a preferably generally annular downstream wall 16 and a generally cylindrical side wall 18 connecting the upstream end 14 with the downstream end 16. The reaction zone 6 is preferably generally cylindrical having a diameter less than that of the first precombustion zone 4 and is connected to the downstream end of the first precombustion zone 4 and is in axial alignment with the precombustion zone 4. A choke or venturi 22 can optionally be positioned in the reaction zone 6 adjacent the precombustion zone 4 if desired.

Preferably, the tunnel 10 which connects the precombustion zone 4 to the external combustor 8 opens generally tangentially into the zone 4 through the generally cylindrical sidewall 18. Preferably, the external combustion zone 8 is defined by refractory defining a generally cylindrical combustion zone 24 in axial alignment with and connected to the tunnel 10. The generally cylindrical combustion zone 24 has an upstream end defined by an upstream end wall 26 and a downstream end defined by a preferably generally annular downstream end wall 28 and a generally cylindrical side wall 30 connecting the upstream wall 26 to the downstream wall 28. A conduit or tunnel 32 preferably empties into the combustion zone 24 through the generally cylindrical side wall 30, preferably in a generally tangential direction. A conduit 34 preferably empties into the generally cylindrical combustion zone 24 in an axial direction with respect to the longitudinal axis of the zone 24. If desired, an optional venturi or choke 36 can be positioned at the upstream end of each tunnel 10 adjacent to the external combustion zones 8. Preferably, the choke member has a first end positioned adjacent to the combustion zone and a second end facing the precombustion zone and a converging section converging from the first end toward the second end and an abruptly diverging zone adjacent the second end diverging toward the second end.

In operation, combustion gases are introduced into the precombustion zone 4 through the at least one tunnel 10. A carbonaceous feedstock is introduced into the precombustion zone 4 through a conduit 38 for pyrolysis with the combustion gases introduced through the tunnel 10. The conduit 38 connects a source of carbonaceous feedstock 40 with the precombustion zone 4, and preferably empties generally axially into the zone 4 through upstream end wall 14. Usually, a small amount of cooling gas 42 is introduced into the precombustion zone 4 annularly to the conduit 38 to prevent the conduit 38 which is usually provided with a nozzle at its discharge end from being exposed to excessively high temperatures. The source 40 is usually provided with a heater so that the contents of the conduit 38 will be at an elevated temperature prior to being introduced into the zone 4.

The pyrolysis reaction which initiates in the zone 4 is quenched in the zone 6 by the introduction into the zone 6 of a suitable quench fluid carried by a conduit 44. Usually, the fluid carried by the conduit 44 is introduced into the zone 6 through one or more nozzles 46. Preferably, the fluid carried by the conduit 44 is water from water source 48 although other suitable quenching fluids such as cool gases can be used if desired. Effluent from the carbon black reactor 2 is withdrawn from the zone 6 by conduit means 50 and routed for further processing as desired in collection zone 52.

According to certain aspects of the present invention, there is connected to the combustion zone 24 a source of air 54, a source of oxygen 56 and a source of combustible fuel 58. Preferably, the air source 54, which can comprise a blower, for example, empties into at least one tunnel 34. The oxygen source 56 is preferably connected to the tunnel 34 between the source 54 and the zone 24 so that oxygen-enriched air is axially introduced into the zone 24. More preferably, at least one of the oxygen source 56 and the air source 54 is provided with a heater, so that the oxygen-enriched air is at an elevated temperature as it enters the zone 24. The fuel gas stream tangentially introduced from source 58 is preferably a so-called low BTU (British Thermal Unit) content fuel gas such as would be recovered from the filters in a carbon black plant. Generally, the fuel gas stream will comprise at least five percent by volume of at least one of molecular hydrogen and carbon monoxide, and will usually contain both at a combined concentration of 20–50% by volume.

In accordance with certain aspects of the present invention, a low BTU fuel gas from source 58 is combusted with oxygen-enriched air from the sources 54 and 56. This combustion can occur in the zone 24, resulting in combustion gases which can be introduced into the zone 4 from the tunnels 10. The combustion gases are admixed with a carbonaceous feedstock. The feedstock, for example, can be introduced into the zone 4 through the conduit means 38. The carbonaceous feedstock is pyrolyzed to form carbon black. Generally, the pyrolysis reaction occurs in the zones 4 and 6. The carbon black-containing smoke is quenched to terminate the carbon-forming reaction by the quench fluid introduced into the reactor from source 48 by conduit 44.

Generally, the low BTU fuel will have a BTU value in the range of 50 to 50 BTU/SCF (BTU per standard cubic foot) usually in the range of from about 60 to about 125 BTU/SCF. Most preferably, the low BTU fuel has a BTU content in the range of from about 70 to about 110 BTU/SCF because such a fuel can be recovered from the filter off-gases in many carbon black plants. It is preferable that the low BTU fuel be preheated to a temperature in the range of from about 800° to about 1600° F., generally to a temperature in the range of 1000° to about 1400° F. and most preferably in the range from about 1100° to about 1300° F. since this is the highest temperature easily achievable without exceeding the metallurgical limits of materials commonly employed for constructing a heat exchanger.

The oxygen-enriched air is usually preheated to a temperature in the range of from about 800° to about 1600° F., usually to a temperature in the range of from about 1000° to about 1400° F., and most preferably to a temperature in the range of 1000° to about 1300° F. because it is generally practical to achieve and impractical to exceed this temperature. The preheating is usually provided by passing the oxygen-enriched stream into indirect heat transfer relationship with the reactor tail-gases although other means can be provided if desired. Generally, the oxygen-enriched stream will have an oxygen content in the range of from about 25 to about 75 volume percent molecular oxygen. Usually, the oxygen content of the oxygen-enriched air stream will be in the range of from about 25 to about 40 percent molecular oxygen. Most preferably, the oxygen content will be in the range of from about 30 to about 40 percent molecular oxygen since carbon blacks having the desired negative tint residuals can be produced by using oxygen-enriched air having an oxygen content within this range and the expense of further oxygen enrichment is thus avoided.

The low BTU content fuel is combusted with the oxygen-enriched air, generally in the presence of from about 20 to about 80 percent greater than the stoichiometrically required amount of oxygen. Usually, the low BTU fuel will be combusted with from about 35 to about 65 volume percent greater than the stoichiometric amount of oxygen required for combustion of the fuel. Most preferably, the low BTU fuel is combusted with the oxygen-enriched air in an amount sufficient to provide from about 45 to about 55 volume percent greater than the stoichiometric amount of oxygen required for combustion of the fuel, since this range of values closely encompasses values tested with good results.

The carbonaceous feedstock is then admixed in the zone 4 with the above-described combustion gases in an amount of from about 25 to about 125 pounds of feedstock per 1000 SCF of oxygen-enriched air used to form the combustion gases. Usually, from about 40 to about 100 pounds of feedstock per 1000 SCF of oxygen-enriched air used to form the combustion gases is introduced into the zone 4. Most preferably, from about 50 to about 75 pounds of feedstock per 1000 SCF of oxygen-enriched air is introduced into the zone 4 and even more preferably about 58 to about 68 pounds of feedstock per 1000 SCF of oxygen-enriched air since amounts of feedstock closely encompassed by this range have been used with good results.

It has been found according to certain other aspects of the present invention that using preheated low BTU off-gas as fuel and preheated oxygen-enriched air as oxidant every 5 percent increase of oxygen content in the oxidant will decrease the tint residue by about 2 units. By using a gas of 100 BTU/SCF or lower heating value for fuel and oxygen-enriched air to about 35 percent oxygen content as oxidant, both preheated to about 1200° F., negative 7 to negative 8 tint residual carbon blacks can be easily produced.

Generally speaking, in a reactor charging oxygen and air to form oxygen-enriched air and fuel for combustion with the oxygen-enriched air to form combustion gases and carbonaceous feedstock for pyrolysis with the combustion gases to form carbon black having a selected surface area, the tint residual of the carbon black product can be changed by changing in a first direction the oxygen rate, the fuel rate, and the carbonaceous feedstock rate, and a changing in a second direction the air rate so that the carbon black being produced exhibits about the selected surface area. The tint residual of the carbon black product will be changed in the second direction by this procedure. By direction, of course, is meant that the rates are either increased or decreased. Where the feed rates of the oxygen, fuel and carbonaceous feedstock are increased, it will be necessary to decrease the feed rate of the air to reduce the surface area of the carbon black being produced to within desired limits. The tint residual of the carbon black product will be decreased from a first value to a second, lower value. Where the feed rates of the oxygen, fuel and carbonaceous feedstock are decreased, the feed rate of the air can be increased to increase the surface area of the carbon black product back to within the desired limits. This procedure will increase the tint residual of the carbon black product from a first value to a second value.

Generally speaking, the tint residual of the carbon black product will change about 2 units for each 5 percent change in the oxygen content of the oxygen enriched air, where the oxygen-enriched air has an oxygen content in the range of from about 20 to about 40 percent. For reduction of the tint residual of a carbon black product by a value in the range of from about 2 to about 6 units from a value of about 0, the feed rate of oxygen can be increased and the feed rate of the air sufficiently decreased to impart to the oxygen-enriched air used in forming the combustion gases an oxygen content in the range of from about 25 to about 35 volume percent. Preferably, the fuel comprises a gas having a heating value in the range of 60 to about 110 BTU/SCF, more preferably in the range of from about 80 to about 100 BTU/SCF. Where such low BTU fuels are utilized, it is further desirable to preheat both the oxygen-enriched air and the fuel used in forming the combustion gases to a temperature within the range of from about 1000° F. to about 1400° F. prior to their being combined for combustion so that combustion will proceed with stability. Although the process is applicable to most any type of carbon black production process, it is preferred that the carbon black being produced be characterized by CTAB surface area in the range of from about 50 to about 150 m²/g and a tint residual in the range of from about −10 to about +10, since these carbon blacks can be widely used in the rubber compounding industry.

The invention is illustrated by the following example.

EXAMPLE

Dimensions for a carbon black reactor very similar to the one illustrated in the FIGURES are shown in the following table.

TABLE I

| | | |
|---|---|---|
| Diameter for Tunnel 54, inches | | 3 |
| Diameter for Tunnel 32, inches | | 3 |
| Diameter of Zone 24, inches | | 15.75 |
| Length of Zone 24, inches | | 3 |
| Venturi 36 | | |
| Entry Diameter, inches | | 10 |
| Exit Diameter, inches | | 5 |
| Half Converging Angle, degrees | | 45 |
| Half Diverging Angle, degrees | | 90 |
| Throat Diameter, inches | | 5 |
| Length, inches | | 5 |
| Diameter of Tunnel 10, inches | 6 tapering to | 3.5 |
| Length of Tunnel 10 from Venturi Exit to Central Line of Zone 4, inches | | 45.5 |
| Diameter of Zone 4, inches | | 10.75 |
| Length of Zone 4, inches | | 4 |
| Venturi 22 | | |
| Entry Diameter, inches | | 3 |
| Exit diameter, inches | | 3 |
| Half Converging Angle, degrees | | 15 |
| Half Diverging Angle, degrees | | 8 |
| Throat Diameter, inches | | 1.6 |
| Length, inches | | 8.6 |
| Diameter of Conduit 46, inches | | 3 |

The reactor was operated under conditions shown in Table II.

TABLE II

| | Run No. | | | |
|---|---|---|---|---|
| | (1) | (2) | (3) | (4) |
| Air, SCF/Hr., | 6,428 | 5,835 | 5,241 | 4,944 |
| Temperature, °F., | 1,200 | 1,200 | 1,200 | 1,200 |
| Off Gas, SCF/Hr., | 3,843 | 4,267 | 4,691 | 4,903 |
| BTU/SCF, | 95 | 95 | 95 | 95 |
| Temperature, °F., | 1,200 | 1,200 | 1,200 | 1,200 |
| Oil, Lbs/Hr., | 80.2 | 88.5 | 100 | 101 |
| BMCI, | 125 | 125 | 125 | 125 |
| API, 60/60° F., | −1 | −1 | −1 | −1 |
| Jacket Air, SCF/Hr., | 200 | 200 | 200 | 200 |
| Added O₂, SCF/Hr., | 0 | 200 | 400 | 500 |
| Total O₂, SCF/Hr., | 1,350 | 1,425 | 1,501 | 1,538 |
| Vol. % O₂ in "AIR", | 21 | 23.6 | 26.6 | 28.3 |
| O₂/Oil, SCF/Lb., | 16.8 | 16.1 | 15.0 | 15.2 |
| Vol. "Gas" Total, SCF/Hr., | 10,271 | 10,302 | 10,332 | 10,347 |
| Off Gas BTU in./Hr., | 365,085 | 405,365 | 445,645 | 465,785 |
| Off Gas BTU/Lb. Oil, | 4,552 | 4,580 | 4,456 | 4,612 |
| Off Gas BTU/SCF "Gas" in., | 35.54 | 39.35 | 43.13 | 45.02 |
| Product Properties | | | | |
| Tint Residual (approximate) | −1 | −2 | −4 | −5 |
| Tint | 108 | 107 | 102 | 103 |
| CTAB, m²/g, | 103 | 103 | 98 | 100 |

Table 2 shows that the tint residual of the carbon black product decreases from runs 1 to 4. As the tint residual decreases, the air decreases, the off-gas fuel increases, the oil rate increases, and the oxygen enrichment increases. CTAB is substantially constant, as is the fuel/oil ratio.

What is claimed is:

1. A method for changing the tint residual of a carbon black product having a selected CTAB surface area in the range of 50 to about 150 m²/g and a tint residual in the range of −10 to about +10, said carbon black being produced by a reactor by charging oxygen and air to provide oxygen-enriched air having a molecular oxygen content in the range of 25 to 35 volume percent and gaseous fuel having a heating value in the range of 60–125 BTU/SCF for combustion to form the combustion gases and carbonaceous feedstock for pyrolysis by the combustion gases to form carbon black comprising changing in a first direction the oxygen rate, the fuel rate and the carbonaceous feedstock rate and changing in a second direction the air rate so that the carbon black being produced exhibits about the selected surface area, whereby the tint residual of the carbon black product is changed in the second direction.

2. A method as in claim 1 comprising increasing the feed rates of the oxygen, fuel and carbonaceous feedstock and decreasing the feed rate of air to decrease the tint residual of the carbon black product from a first value to a second, lower value.

3. A method as in claim 1 comprising decreasing the feed rates of the oxygen, fuel and carbonaceous feedstock and increasing the feed rate of air to increase the tint residual of the carbon black product from a first value to a second, higher value.

4. A method as in claim 1 wherein both the oxygen-enriched air and the fuel used in forming the combustion gases are at a temperature in the range of from about 1000° F. to about 1400° F. prior to their being combined for combustion.

\* \* \* \* \*